United States Patent
Rehm et al.

(10) Patent No.: US 6,753,636 B2
(45) Date of Patent: Jun. 22, 2004

(54) SPINDLE MOTOR FOR HARD DISK DRIVES WITH IMPROVED RUNNING ACCURACY

(75) Inventors: Thilo Rehm, Villingen-Schwenningen (DE); Jörg Hoffmann, Mettlach (DE)

(73) Assignee: Precision Motors Deutsche Minebea GmbH, Villingen-Schwenningen (DE)

(*) Notice: Subject to any disclaimer, the term of this patent is extended or adjusted under 35 U.S.C. 154(b) by 0 days.

(21) Appl. No.: 09/860,822

(22) Filed: May 18, 2001

(65) Prior Publication Data

US 2002/0070614 A1 Jun. 13, 2002

(30) Foreign Application Priority Data

May 27, 2000 (DE) .......................................... 100 26 467

(51) Int. Cl.[7] ................................................ H02K 1/12
(52) U.S. Cl. ........................ 310/258; 310/254; 310/259; 310/90; 29/596
(58) Field of Search ................................ 310/258, 254, 310/259, 67 R, 90, 40, 43; 29/596, 606; 33/377; 73/514.08

(56) References Cited

U.S. PATENT DOCUMENTS

| | | | |
|---|---|---|---|
| 4,607,182 A | | 8/1986 | Ballhaus ....................... 310/90 |
| 4,703,209 A | * | 10/1987 | Wrobel ....................... 310/67 R |
| 4,755,709 A | * | 7/1988 | De Jager ..................... 310/90.5 |
| 4,949,000 A | * | 8/1990 | Petersen ....................... 310/179 |
| 5,045,738 A | * | 9/1991 | Hishida et al. ................ 310/90 |
| 5,073,735 A | * | 12/1991 | Takagi ........................... 310/71 |
| RE33,813 E | * | 2/1992 | von der Heide et al. ...... 310/51 |
| 5,177,650 A | * | 1/1993 | Jabbari et al. ........... 360/99.08 |
| 5,200,866 A | * | 4/1993 | Fruge et al. ............. 360/99.08 |
| 5,227,686 A | * | 7/1993 | Ogawa ......................... 310/90 |
| 5,245,234 A | * | 9/1993 | Okada et al. ................. 310/51 |
| 5,254,892 A | * | 10/1993 | Bosman et al. ........... 310/49 R |
| 5,334,895 A | * | 8/1994 | Morioka et al. .......... 310/67 R |
| 5,454,724 A | * | 10/1995 | Kloeppel et al. .............. 439/17 |
| 5,508,578 A | * | 4/1996 | Suzuki et al. ................ 310/254 |
| 5,596,235 A | * | 1/1997 | Yazaki et al. .............. 310/67 R |
| 5,698,919 A | * | 12/1997 | Obara .......................... 310/90 |
| 5,831,355 A | * | 11/1998 | Oku ............................. 310/42 |
| 5,850,318 A | * | 12/1998 | Dunfield et al. ......... 360/99.08 |
| 5,866,961 A | * | 2/1999 | Suzuki et al. ............. 310/67 R |
| 5,925,946 A | * | 7/1999 | Weingord et al. ............. 310/51 |
| 5,945,751 A | | 8/1999 | Hans et al. ................ 310/67 R |
| 5,977,675 A | * | 11/1999 | Oelsch ......................... 310/90 |
| 5,982,057 A | * | 11/1999 | Imada et al. .................. 310/43 |
| 5,982,070 A | * | 11/1999 | Caamano .................... 310/216 |
| 5,986,378 A | * | 11/1999 | Caamano .................... 310/216 |

(List continued on next page.)

FOREIGN PATENT DOCUMENTS

| | | | | |
|---|---|---|---|---|
| DE | 34 19 814 | 11/1985 | | |
| DE | 41 21 428 | 1/1993 | | |
| DE | 94 00 004.2 | 3/1995 | | |
| EP | 0 905 857 | 3/1999 | | |
| JP | 10-248223 | 9/1998 | | |
| WO | WO 97/00550 | * | 5/1996 | ............ H02K/5/24 |
| WO | WO 97/00550 | 1/1997 | | |
| WO | WO-97/00550 | * | 1/1997 | ............ H02K/5/24 |

*Primary Examiner*—Burton S. Mullins
*Assistant Examiner*—Heba Elkassabgi
(74) *Attorney, Agent, or Firm*—Baker & Daniels (57) ABSTRACT

The invention related to a spindle motor for hard disk drives with improved running accuracy where the sheet metal package or the complete stator consisting of sheet metal package and windings is encompassed by a centering casing of plastic, which is preferably applied by means of an injection molding operation. Depending on the design of the spindle motor the centering casing can be centered on the stationary shaft and/or on the outer rings/inner raceways pertaining to the sets of roolling bodies. Furthermore, a stator without centering casing is described whose sheet metal package is centered directly on the outer rings/inner raceways.

18 Claims, 11 Drawing Sheets

U.S. PATENT DOCUMENTS

| | | | | |
|---|---|---|---|---|
| 6,002,185 A | * | 12/1999 | Nakao et al. | 310/43 |
| 6,020,661 A | * | 2/2000 | Trago et al. | 310/43 |
| 6,043,583 A | * | 3/2000 | Kurosawa et al. | 310/254 |
| 6,058,594 A | * | 5/2000 | Neumann et al. | 29/596 |
| 6,097,121 A | * | 8/2000 | Oku | 310/91 |
| 6,148,596 A | * | 11/2000 | Kimura et al. | 57/100 |
| 6,282,053 B1 | * | 8/2001 | MacLeod et al. | 360/98.07 |
| 6,320,288 B1 | * | 11/2001 | Suzuki et al. | 310/68 B |
| 6,362,554 B1 | * | 3/2002 | Neal | 310/254 |
| 6,441,519 B1 | * | 8/2002 | Oelsch | 310/67 R |
| 6,483,214 B1 | * | 11/2002 | Oelsch | 310/68 R |
| 6,586,856 B2 | * | 7/2003 | Oelsch | 310/90 |

* cited by examiner

SPINDLE MOTOR FOR HARD DISK DRIVES WITH IMPROVED RUNNING ACCURACY

BACKGROUND OF THE INVENTION

1. Field of the Invention

In the computer industry, hard disk drives have been used for many years for the permanent storage of data.

2. Description of Related Art

The need and thus the demand for more memory capacity and shorter access times on less memory space will necessarily result in a higher track density at a respectively higher speed. Higher track densities, in turn, can be achieved only with smaller track pitches and narrower data tracks.

With a track density of 25,000 tracks per inch (corresponding to a track pitch of approx. 1 μm) with exponentially increasing tendency and a number of revolutions of 7,200 with linear increasing tendency, the requirements for the running accuracy of the spindle motors will also increase.

The drive motor, comprising a rotor with permanent magnet, a stator package with windings disposed on a base plate, a shaft, which is firmly connected with the rotor or the base plate, and a bearing system with at least one set of rolling bodies, causes the memory disk(s) disposed on the rotor to rotate.

In order to keep the effect of the unavoidable defects of form and component tolerances of the rolling bodies, the inner raceways and outer rings of the bearings on the running accuracy of the motor as low as possible it is common practice to brace the sets of rolling bearings against each other.

As a result, the bearing components rotating relative to each other are elastically deformed at their common places of contact. Consequently, each individual rolling body ball can be viewed as a system of two successively connected equivalent springs.

External forces in this spring-mass system lead the rotor to make evading motions or to wobble. As a result of an unfavorable frequency spectrum of the external forces the system can be caused to oscillate and to oscillate at a natural frequency. Depending on the system, the attenuation in this type of system is very low, so that the amplitudes of such oscillation may reach unacceptable values which could then lead to read/write errors.

Therefore, in order to further increase the running accuracy the external forces acting on the rotating system have to be minimized.

Said external forces are caused by electromagnetic interactions between the multipolar magnetized permanent magnet mounted in the rotor and the stator package. A sequential supply of current to the windings disposed on the stator package produces a magnetic traveling field that generates the torque as a result of the interaction with the individual poles of the ring-shaped permanent magnet, which torque drives the rotor. At the same time, forces acting radially on the rotor are generated.

Defects of concentricity and form can disturb the symmetry of said radial forces so that rotating or stationary residual forces can be generated which could cause the rotating system to oscillate and thus impair the running accuracy of the motor.

As a result of defects of form or position of the multipolar magnetized permanent magnet, which is manufactured by means of pressing and/or sintering and which is preferably plastic bonded and mounted in the rotor, and by positional errors (coaxiality errors, concentricity errors) of the stator package which is accommodated and positioned on the inside diameter via a collar-shaped projection in the base plate, the operating air gap of the motor is neither constant with regard to the width of the gap nor is it oriented concentric or coaxial relative to the axis of rotation. As a result the width of the gap also changes with the relative angular position between stator and rotor.

However, in order for the geometric sum of all the radial force components from the electromagnetic circuit acting on the rotor to be zero the width of the gap must be constant over the full circumference and independent of the angular position between rotor and stator.

In other words: the higher the positional errors of the stator and the higher the fluctuations in the gap width of the operating air gap that act on the circumference, the higher are the radial force components acting on the rotor in practical application.

This is where the invention comes into play with the objective of reducing both the deviation in the concentricity or coaxiality of the operating air gap with regard to the axis of rotation and the fluctuations in the gap width of the operating air gap over the circumference so as to minimize the resulting radial components of the external forces acting on the rotor.

Based on JP 10-248223 (1998), it is already known to center the stator with a mounting sleeve where the stator is pressed into the mounting sleeve and the mounting sleeve, in turn, is mounted on the stationary shaft. Said mounting is also achieved either with a press fit or by adhesive bonding.

This known embodiment, however, does not ensure that the required coaxiality of the operating air gap is achieved because the connection of the stator with the mounting sleeve is highly subject to tolerances which may cause a slanting position, for example, and the operating air gap is then no longer coaxial.

Another disadvantage of the above embodiment is that because the mounting sleeve is manufactured separately, the respective fitting surfaces of the mounting sleeve cannot be made with adequate accuracy and that a respective installation play will cause a mismatch when the individual parts of the spindle motor are assembled. As a result, the width of the operating air gap will vary in size and it is also dependent on the relative angular position between rotor and stator.

The same criticism applies to U.S. Pat. No. 5,925,946 which also provides a separately manufactured mounting sleeve which is connected with the stator so as not to rotate, which mounting sleeve, in turn, abuts on a vertically formed collar of the stationary base plate. A further disadvantage is that the centering does not take place on the actual relevant part, i.e. the stationary shaft, but only indirectly on the base plate which is connected with the stationary shaft.

Again, the potential mismatch could impair the coaxiality of the operating air gap.

BRIEF SUMMARY OF THE INVENTION

Therefore, to solve the above problem the invention according to a first embodiment provides that the sheet iron package or the complete stator, consisting of sheet iron package and winding, in accordance with the invention is now encompassed by means of injecting a centering casing, which centering casing consists of plastic and where the centering casing either—in case of a stationary shaft—is centered directly on the stationary shaft, or—in case of a rotating shaft—it is centered on the outer ball bearing ring of the rolling bearing.

With the given technical theory of using a sheet metal package or a stator encompassed by means of injecting plastic which forms a centering casing that directly joins the stationary part thus offers the substantial advantage of minimizing the mismatch of the operating air gap, i.e. reducing it to a constant very low value. Normally, the size of such air gaps is 0.1 to 0.3 mm and applying the measures of the invention it is now possible for the first time to substantially minimize the tolerances in relation to the width of the air gap, which were previously viewed as restricting the function, so as to optimize the constancy of the air gap. It was possible to achieve a reduction of up to 3% in the mismatch which was caused previously according to the state of the art by dimensional tolerances.

The reason for this success, among others, is an injected centering casing which encompasses the sheet iron package and/or the stator. Using such an injected part has the advantage that the injection mould can be manufactured with high precision resulting in highly accurate, concentric and exact sleeve, supporting and positioning surfaces where the stator can be joined, centered and encompassed by injection which was not the case with the above mentioned separate mounting sleeves pertaining to the state of the art.

It is important that the sheet metal package, or the complete stator, is centered in the injection mold during the injection operation via one or more stop or supporting surfaces engaging on the outside circumference as the air gap tolerance is minimized according to the invention because the mismatch of the magnetically active outside diameter of the sheet metal package relative to the inside centering surface which is formed by the plastic mass is determined only by the accuracy of the injection mould.

Manufacturing the centering surface in the injection mould offers the further advantage that the work results achieved are always reproducible because the same form is always generated in the same place with the same injection and the same concentricity, which was not possible with the previously known separate mounting sleeves. The winding package is always placed in the injection mould at the same angular position.

Therefore, injection molding allows the reproducibility of the respective fitting surfaces, which was not the case in the state of the art.

Another characteristic feature of the invention is that the injected centering casing of the invention is directly put against the shaft that determines the axis of rotation of the rotor where it is centered precisely. This determines and provides a precise measure between the rotating permanent magnet or its inside surface forming the air gap and the stationary stator with its radially outside lying surface, irrespective of the relative angular position of the rotor.

Another embodiment of the invention provides that instead of a spindle motor with a stationary shaft a spindle motor with a rotating shaft is used. For this embodiment, separate protection is claimed independent of the above first solution. In this case, it is material that the injected centering casing is not centered on the base plate but analogous on the outer ring of at least one rolling bearing. The outer ring has the lowest possible mismatch in relation to the axis of rotation which is why it is preferred in accordance with the second proposed solution of the invention that the injected centering casing is put against and centered on said outer ring of the rolling bearing.

The minimal mismatch attributed to the stationary outer ring is the smallest possible mismatch of all stationary parts relative to the axis of rotation because it is connected with the shaft without play via the inner ring and the rolling bodies.

Therefore, the centering casing is directly associated with the virtual axis of rotation because intermediate members without play are interconnected, while leaving it open under this invention how said connection between said parts (stationary shaft or stationary outer ring of the rolling bearing) will be achieved. Both compression joining and adhesion bonding are claimed. In other words, the stator may be connected via a compression and/or adhesive connection with the respective stationary parts. Such stationary parts may include a shaft 2, a centering casing 19 and/or an outer ring 31.

In a third solution for solving the problem, it is claimed that instead of an injected centering casing a separate centering casing is used which was manufactured in advance, but which again is put against the stationary outer ring of the rolling bearing for centering purposes.

This type of centering between a separate centering casing which is connected with the stator and the remaining parts of a spindle motor has not previously been known according to the state of the art. Therefore, it is claimed as being relevant to the invention that said centering casing (whether injected or manufactured as a separate part) is put against and centered on at least one outer ring of a rolling bearing of the spindle motor.

Another embodiment of this third proposed solution provides that the two sets of rolling bodies which are disposed aligned one on top of the other rotate in a common outer ring and that the (injected or separately manufactured) centering casing is put against and centered on said common stationary outer ring of the rolling bearing.

In this case, it is also claimed as conforming with the solution if the complete centering casing is omitted and the stator merely lies directly on the outer ring of the rolling bearing of the spindle motor. Consequently, the centering casing is omitted completely in this case and the stator, preferably with its sheet iron package, is put against and mounted directly on the outer ring of the rolling bearing.

In reverse, when the centering casing and the stationary shaft are omitted the sheet metal package can be centered directly on the inner raceway of the ball bearing and/or the shaft.

The above mounting can also be achieved via various mounting mechanisms, such as compression, adhesion or wedging.

In a manner of speaking, the centering casing claimed in all previous embodiments is reduced to a zero value so that preferably the sheet iron package is directly put against the outer ring of the rolling bearing.

Also contributing to further solving the problem according to the invention, i.e. minimizing the mismatch for the benefit of optimizing the coaxiality of the operating air gap, in all previously proposed solutions is that high-precision permanent magnets are used. The radially inside lying surface of the permanent magnets defines the second surface of the air gap to be minimized.

In this case, it is preferable if the permanent magnets are mounted on the inside circumference of the rotating rotor so as to achieve the required coaxiality of the operating air gap. For attaching the permanent magnets in the rotor special centering devices are used which take measure based on the distance relative to the rotor bell and thus determine the place of installation for the magnet in the rotor with high precision.

The subject matter of this invention is not only the result of the subject of the individual patent claims, it is also the result of the combination of the individual patent claims.

All information and characteristic features disclosed in the documents, including the abstract, particularly the spatial configuration shown in the drawings, are claimed as relevant to the invention insofar as they are new individually or combined relative to the state of the art.

BRIEF DESCRIPTION OF THE DRAWINGS

The invention will be explained below in more detail by means of the drawings that show several embodiments. The drawings and the descriptions thereof provide further characteristic features and advantages of the invention which are relevant to the invention.

In the various embodiments of the spindle motor according to FIGS. 1 to 5, the same reference numbers are always used for the same parts.

DETAILED DESCRIPTION OF THE INVENTION

Figure 1:
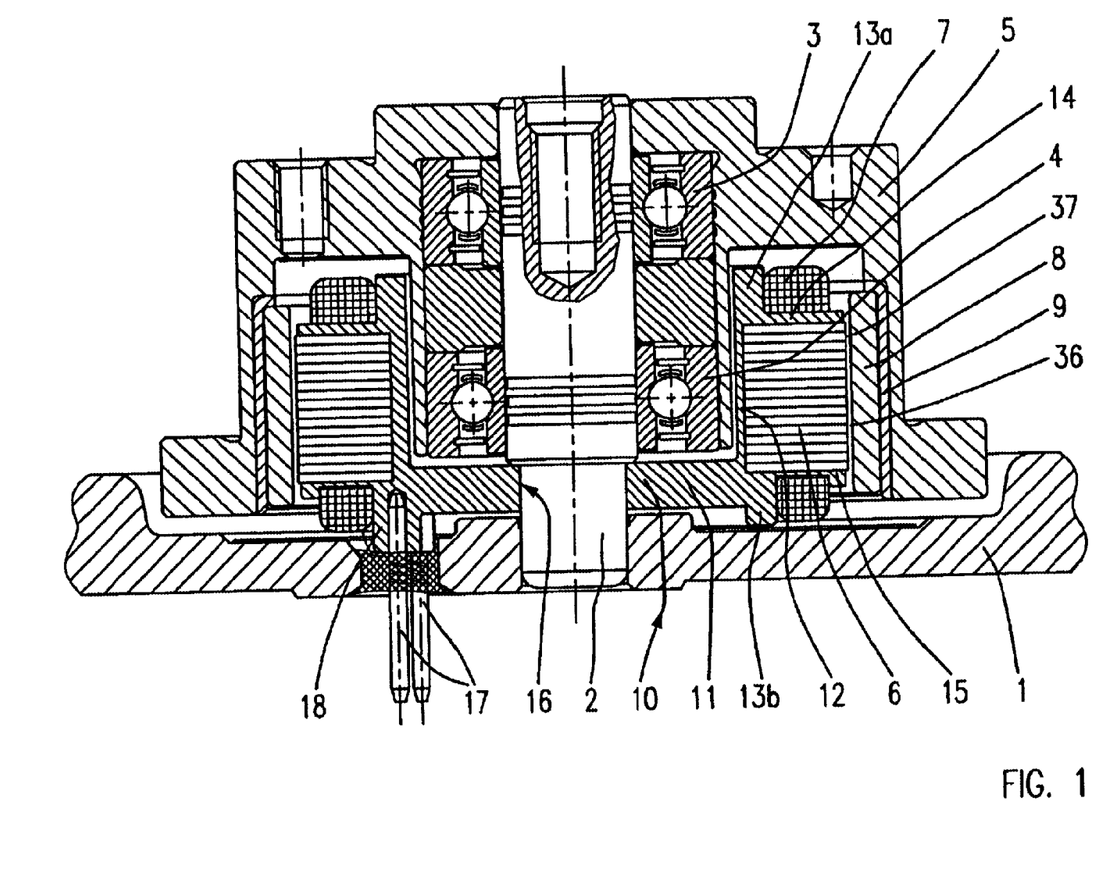
FIG. 1: profile of a first embodiment of a spindle motor.
Figure 2:
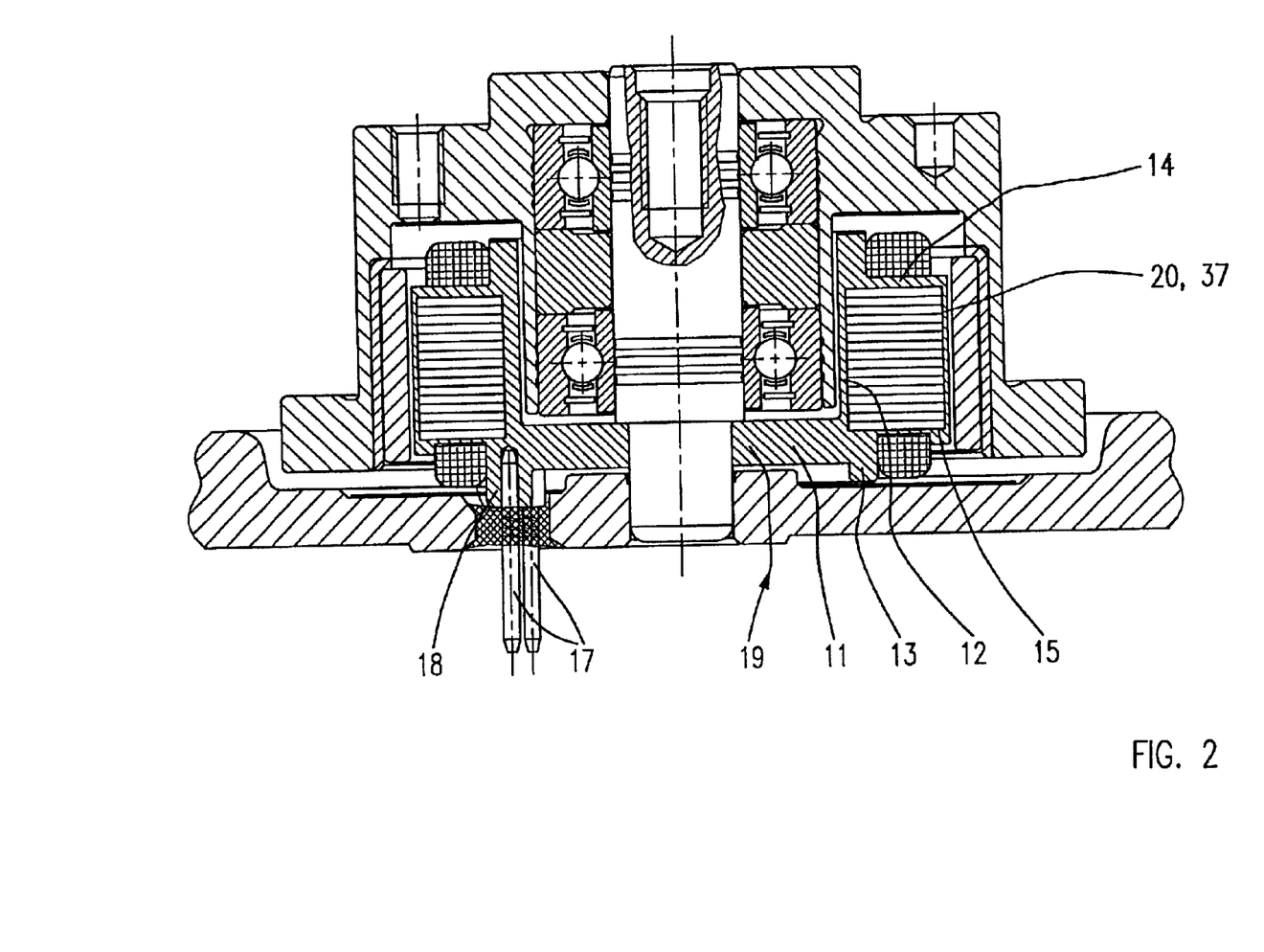
FIG. 2: profile of a second embodiment of a spindle motor.

According to FIGS. 1 and 2, a stationary shaft 2 is embedded in a stationary base plate 1 on which shaft two rolling bearings 3, 4 are disposed at a distance from each other carrying an outside rotating rotor which is driven rotating.

Figure 3:
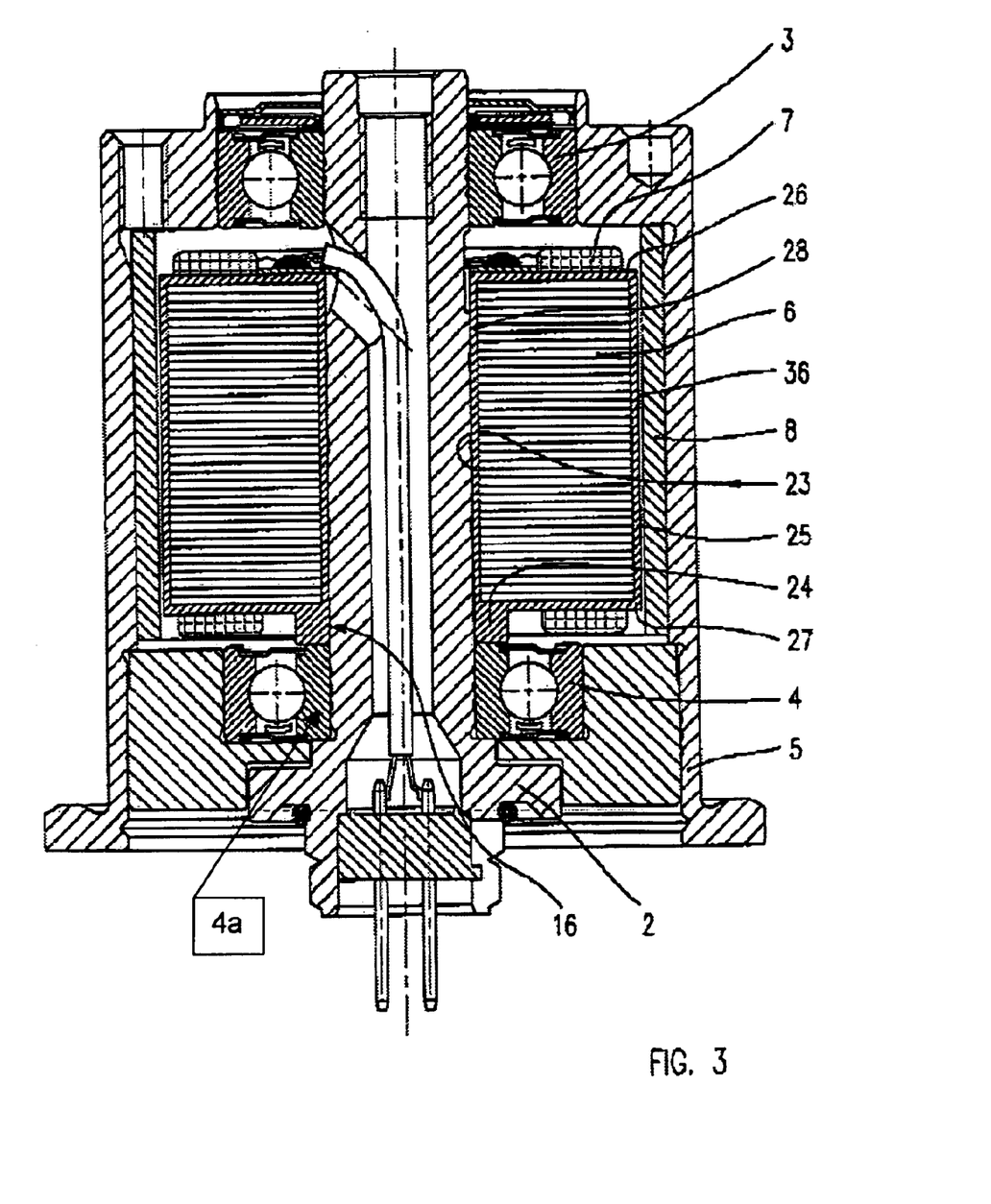
FIG. 3: profile of a third embodiment of a spindle motor.

FIG. 3 shows a spindle motor fully mounted on a stationary shaft where the shaft is connected with the base plate so as to be removable (base plate is not shown).

The rotating actuation of the rotor bell 5 is achieved in that on the inside circumference of the rotor a rear closing ring 9 is disposed on whose inside circumference pairs of magnetic poles of a preferably ring-shaped permanent magnet 8 are disposed evenly distributed. The rear closing ring 9 may be omitted if, as shown in FIG. 3, the rotor bell 5 consists of a ferromagnetic material.

The inside surface of the preferably ring-shaped permanent magnet 8 which is spaced apart from the stationary stator, together with the outside surfaces of the sheet iron package 6, forms the operating air gap 36. The stator substantially consists of a sheet iron package 6 which is provided with windings 7 in a manner known in the art.

According to the invention the error of coaxiality of the operating air gap (air gap 36) with regard to the axis of rotation and the deviation in the gap width should be maintained constant and minimal.

For this purpose, FIG. 1 provides for using a centering casing 10 of plastic which is configured as a plastic injection molded part and which at least partially encompasses the sheet metal package and/or the stator and which at the same time is centered by means of centering surfaces 16 on the stationary shaft 2.

Therefore, it is important that the centering casing 10 as a plastic injection molded part at least partially encompasses the sheet metal package 6 and properly sets its position or location and accurately orients it relative to the axis of rotation so as to ensure the coaxiality of the electromagnetically active air gap 36. In this case, the (drawn) center line as per FIG. 1 does not necessarily coincide with the actual axis of rotation.

The centering casing 10 in this case consists of a lower, disk-shaped bottom 11 with predominantly horizontal orientation, which is orientated with respective centering surfaces 16 on the corresponding centering surface of the shaft 2 and is mounted in the proper position. Said horizontal bottom 11 changes to a vertically oriented sleeve 12, whose wall thickness is configured as thin as possible, which encompasses the inside surface of the sheet iron package 6 and whose inside lateral surface is spaced apart from the continuous vertical encompassing surface of the rotor bell 5.

Said vertical sleeve 12 changes to a collar 13a of a larger dimension which represents the radially inward oriented stop limit for the winding 7.

Therefore, the sheet iron package 6 is encompassed by means of injecting the centering casing 10 and thus it is at least partially imbedded in the encompassing plastic while the winding 7 is subsequently applied, including the horizontal bridges 14.

Accordingly, this achieves a perfect and precise centering of the surfaces of the sheet iron package 6 that lie radially outside and determine the inner side of the air gap 36 relative to the shaft 2 which indirectly determines the axis of rotation because the complete injection molded part (centering casing 10) including the imbedded sheet metal package is attached to and centered via the horizontal bottom 11 directly on said shaft 2 by means of the centering surfaces 16.

In this case, it is important that during injection molding the stator sheet metal package (sheet iron package 6) is held via precisely determined stop surfaces in the injection mould with its radially outside lying surfaces 37 so that the position and the dimensional accuracy of the surfaces 37 relative to the centering surface 16 is determined and defined via the injection mould.

Similarly, as the top bridges 14 encompass the sheet iron package 6 from the top, the bottom bridges 15 together with the sleeve 12 complete the molded form and thus the insulation of those parts of the sheet iron package 6 on which the winding(s) 7 are disposed. The bridges 14, 15 are connected with the sleeve 12 so as to be one piece of material.

The bottom collar 13b again serves as a radially inward oriented limit stop for the winding(s) 7. Therefore, the sheet iron package 6 is first encompassed by means of injecting the centering casing 10 and then the windings 7 are applied. Consequently, the centering casing at the same time is the winding carrier for the windings 7.

A further development of the invention provides that the connection pins 17 are also injected into said centering casing 10 and are held by the latter so as to ensure a simple and secure mounting for the connecting pins 17 without any further mounting means.

FIG. 2 shows that in addition to the partial injection around the sheet iron package 6 by means of the sleeve 12 and the bridges 14, 15 a full surface imbedding injection with additional lateral surfaces 20 can also be provided by including the bottom 11 and the collar 13 as per FIG. 1, as a result of which the sheet iron package 6 is fully encompassed by plastic, thereby providing further protection against corrosion for the sheet iron package 6.

Because the sheet metal package in FIG. 2 is fully encompassed by plastic and thus a variation of imbedding the sheet metal package is provided the centering casing as per FIG. 2 is identified with reference number 19.

Also, in connection with FIG. 1 it should be noted that the connection pins 17 dip into associated projections 18, both of the centering casing 10 and the centering casing 19, where they are injected or otherwise installed. In another embodiment the connecting pins 17 can also be injected directly into the bottom 11 if the projections 18 are omitted.

FIG. 3, as a revised exemplary embodiment, shows the injection fully encompassing a sheet iron package 6 with a centering casing 23, which in turn, has an axially downward oriented projection 24 with which the complete centering casing 23 is supported on the stationary inner raceway 4A of the bottom rolling bearing 4 and which can additionally serve as a radial limit stop for the winding(s) 7.

Centering is also achieved via respective centering surface(s) 16 of the casing 28 on the associated surface of the shaft 2. The centering surfaces 16 can extend over the full height of the sleeve-shaped casing 28 including the projection 24, or merely over partial areas and sections of said parts 24, 28.

An excellent coaxiality is achieved again in the area of the air gap 36 because the complete sheet iron package 6 is encompassed by means of injecting the centering casing 23 with which highly precisely defined surfaces can be achieved.

Otherwise, the centering casing 23 consists of an inside vertically oriented sleeve-shaped casing 28 and the outside casing 25, which is sleeve-shaped in sections, connected via horizontal top and bottom spoke-shaped bridges 26, 27 so as to be one piece of material.

Figure 4:
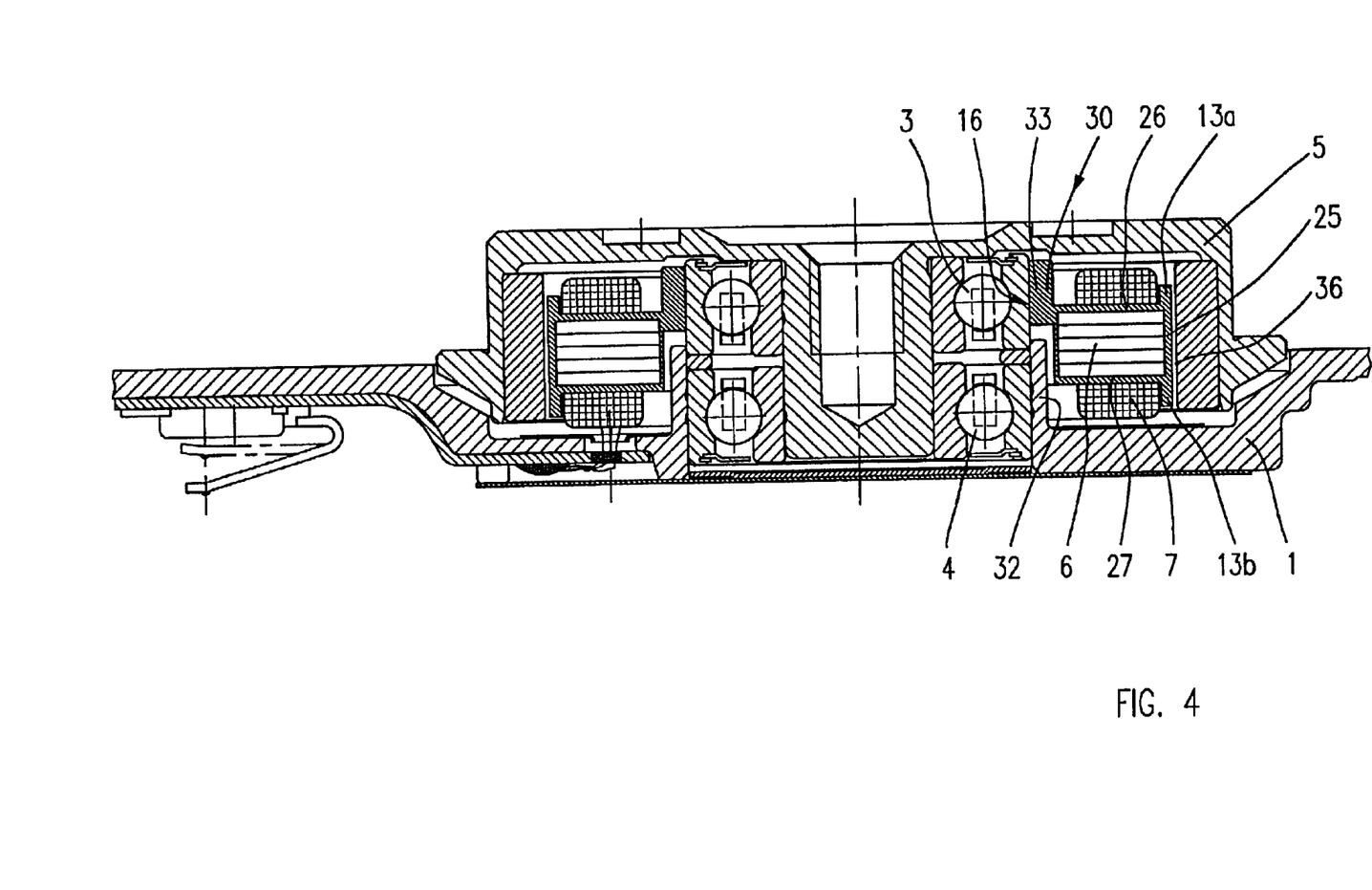
FIG. 4: profile of an embodiment of a spindle motor with rotating shaft.
Figure 5:
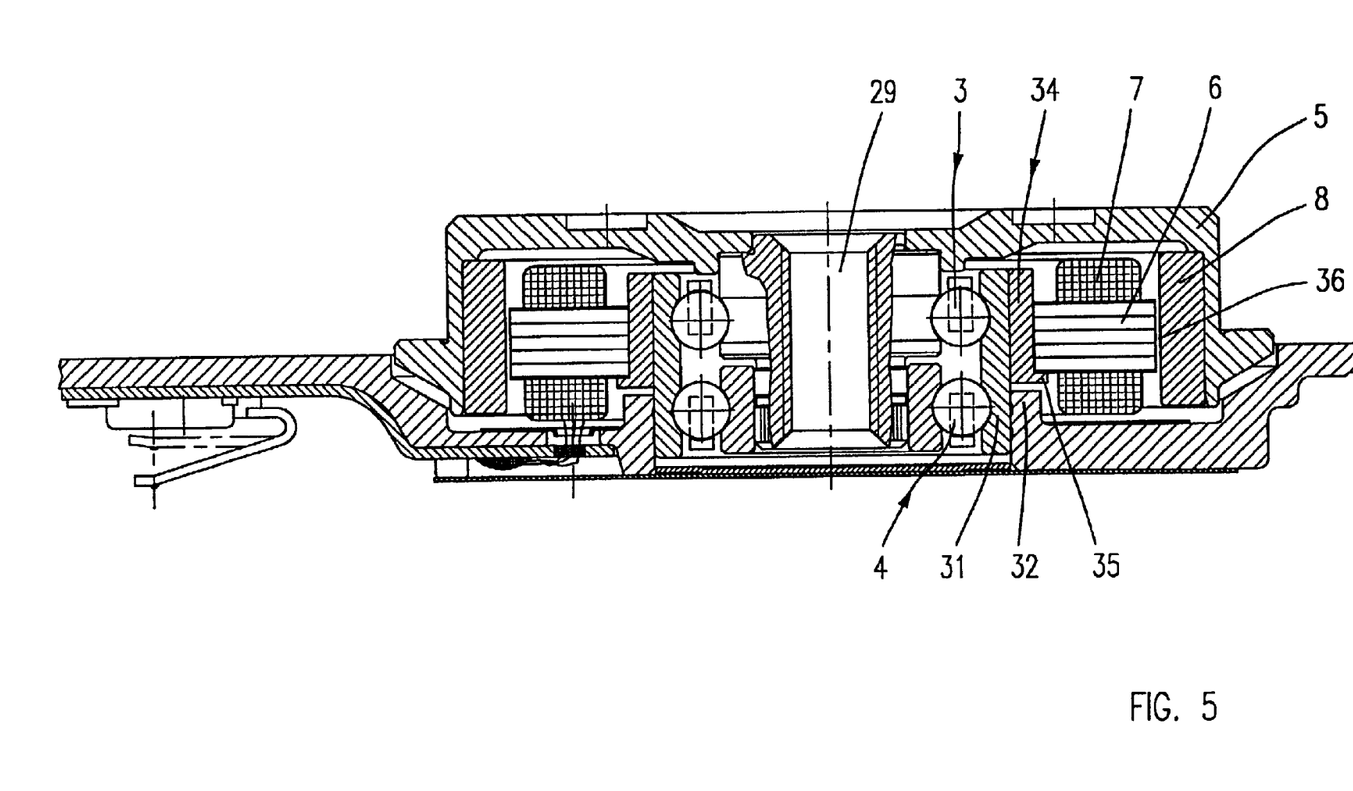
FIG. 5: an embodiment of a spindle motor which was revised relative to FIG. 5 having a common outer bearing ring for both sets of rolling bodies.

The exemplary embodiments as per FIGS. 4 and 5 differ from the above described exemplary embodiments in that instead of a stationary shaft a rotating shaft is provided, which is firmly connected with the rotor bell. This means, on a base plate 1 a rotor bell 5 is positioned so as to rotate relative to the base plate 1 with the aid of the two sets of rolling bodies 3, 4, where in the exemplary embodiment shown the sheet iron package 6, again as per FIG. 4, is encompassed by means of injecting a centering casing 30 and is fully imbedded in plastic. In this case, however, it is relevant that the centering casing 30 is not supported by the shaft, which as an integral part rotates with the rotor bell, but instead it is centered on at least one of the stationary outer rings pertaining to one of the two sets of rolling bodies or on a common outer ring pertaining to both sets of rolling bodies. In the case of FIG. 4, a centering collar 33 is formed on the centering casing 30 whose centering surface 16 is centered on the corresponding surface of the outer ring 31 pertaining to the set of rolling bodies 3.

Otherwise, the complete bearing system consisting of the two sets of rolling bodies 3, 4 and the pertaining bearing rings is accommodated in a sleeve 32 projecting from the base plate 1 and connected so as to be one piece with the base plate in that the sleeve 32 encompasses the stationary outer ring(s) so as to overlap axially. Again, an excellent coaxiality of the air gap 36 is achieved here, because the (stationary) outer rings of the bearing system have the best possible concentricity relative to the axis of rotation and the stator or the sheet metal package is centered directly on the circumference of the outer ring(s).

FIG. 4 does not necessarily require that the centering casing 30 fully encompasses the sheet metal package. The radially outside lying casing 25 may also be omitted.

FIG. 5 differs from FIG. 4 in that the centering casing 30 encompassing the sheet metal package 6 can also be centered on the common outer ring 31.

However, FIG. 5 also shows an additional feature according to which the sheet iron package 6 is not fully encompassed by means of injection, instead only a centering sleeve 34 is provided which on one side lies with its outside circumference on the sheet iron package 6 and which on the other side lies with its inside circumference on the outer ring 31 of the sets of rolling bodies 3, 4, or as per FIG. 4, it lies only on one of the two stationary outer rings so as to be centered.

Therefore, with the above embodiment as per FIG. 5 it is claimed in general form, irrespective of the earlier proposed solutions, that the sheet iron package 6 is centered by means of a centering sleeve 34 directly on the common outer ring 31 or on one of the two outer rings of the sets of rolling bodies 3, 4.

In the general part of the specifications, it was also pointed out that the sheet iron package 6 can be centered directly on the outer ring 31 of the rolling body arrangement while omitting the centering sleeve 34 so that consequently, the centering sleeve 34 can also be omitted completely.

This type of centering a sheet iron package 6, with or without using a centering sleeve 34, is also used to solve the problem, i.e. to maintain the coaxiality of the air gap 36 with a low tolerance.

Figures 7, 8:
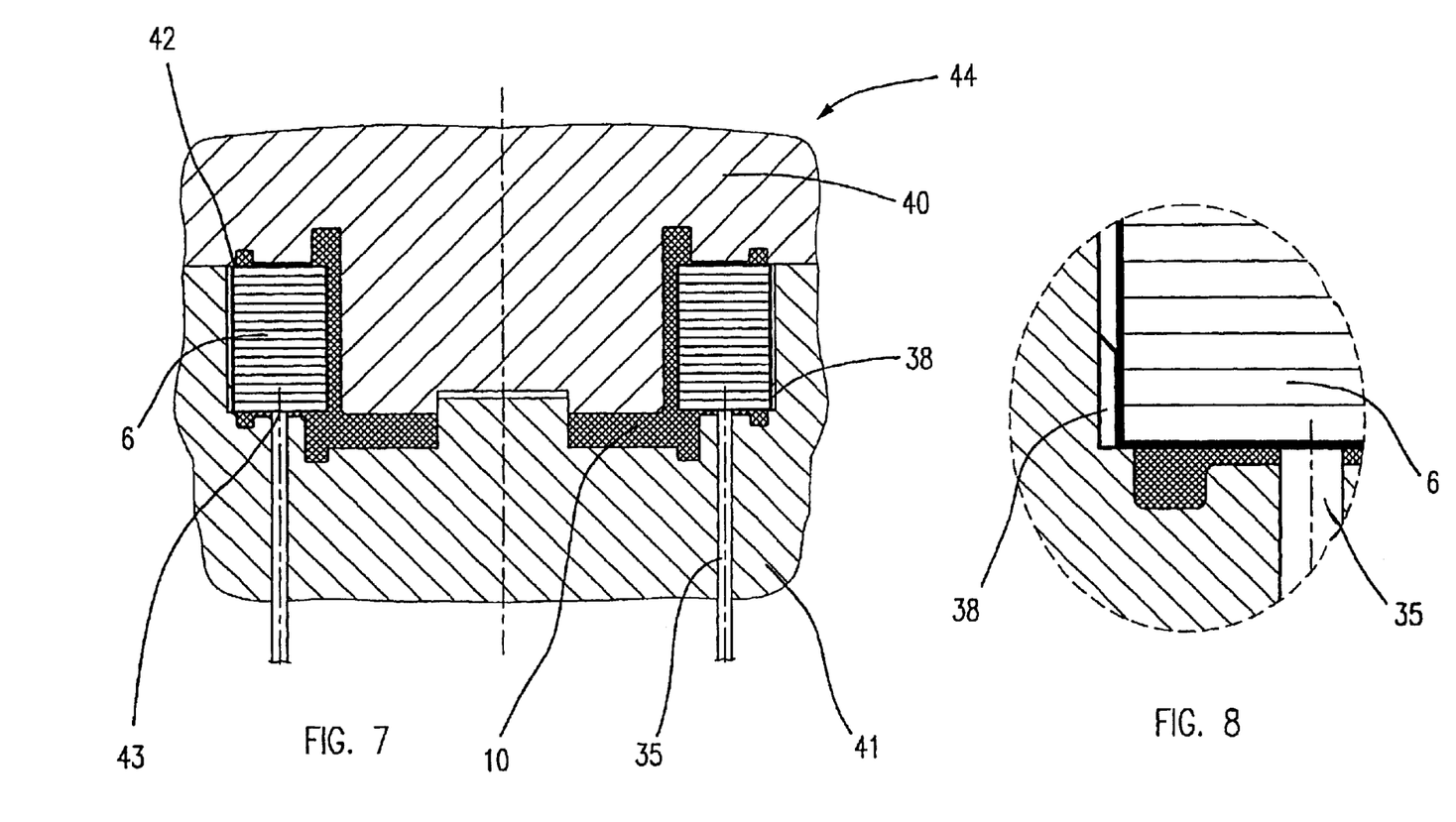
FIG. 7: centering the stator package in the injection mould.
FIG. 8: enlargement of FIG. 7.

FIG. 7 shows a profile of an injection mould with a top mould half 40 and a bottom mould half 41 between which the sheet iron package 6 is inserted.

Centering noses 38 of the injection mould 40, 41 are provided which are disposed in the bottom mould half 41, which are oriented radially inward and lie on the outside circumference of the sheet iron package 6.

Distributed at regular intervals over the circumference of the bottom mould half 41 three centering noses 38 are disposed, for example. However, more centering noses may be disposed.

The height of the centering noses 38 extends approximately to the bottom third of the sheet iron package. The height is freely selected, however, and can also have a different dimension. For example, higher centering noses could be used, which lie on the sheet iron package up to half of the latter's height, for example.

Therefore, the relevant issue is that at least three centering noses 38 are disposed distributed over the circumference at an angle of 120° which provide for automatic centering of the sheet iron package in the injection mould.

Instead of such centering noses 38 centering bars can be used which also lie on the outside circumference of the sheet iron package 6 so as to center.

The axial restriction of the sheet iron package in the mould is the result of applying respective plotters 35 that lie against the bottom of the sheet iron package 6.

FIGS. 7 and 8 show that by means of injecting liquid plastic through an injection opening, which is not shown in detail, the centering casing 10 of plastic then encompasses the sheet iron package in the manner shown in FIG. 7 so that the sheet iron package 6 is therefore encompassed by means of injecting the centering casing 10.

In this case, the radially outside lying circumference of the sheet iron package 6 is not encompassed by the plastic.

Figure 9:
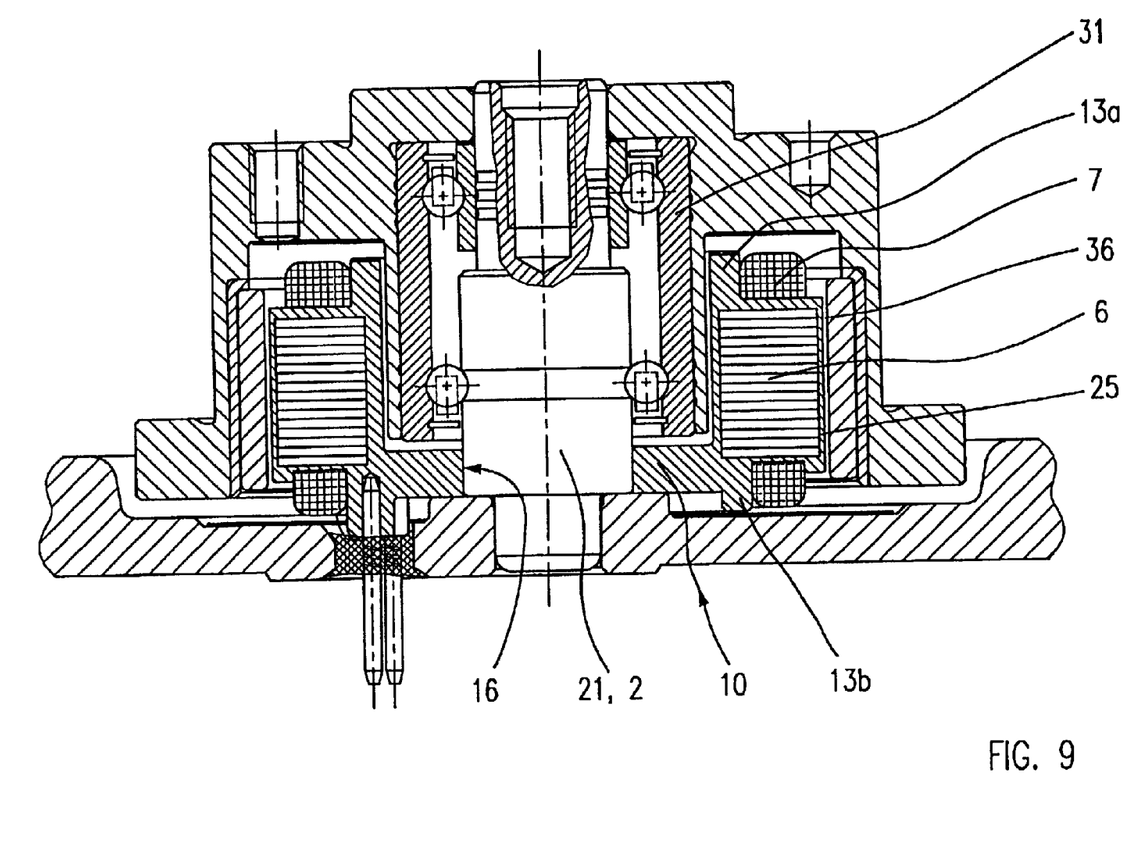
FIG. 9: profile of another embodiment of a spindle motor with support above the inner raceway.

In another embodiment of the injection mould 44, which is not shown in the drawing, it can also be provided that the radial outside circumference of the sheet iron package 6 is also encompassed by plastic as shown in FIG. 9.

Overall, the sheet iron package 6 shown in FIG. 7 is supported in the injection mould 44 by supporting surfaces 42 in the top mould half 40 and by bottom supporting surfaces 43 in the bottom mould half 41 and thus it is centered in axial direction upward and downward.

FIG. 9 shows a profile of another spindle motor with a support via the inner raceway.

The inner raceway 21 is part of the shaft 2 on which the centering casing 10 is directly supported and centered via the centering surfaces 16.

The difference between FIG. 2 and FIG. 9 is that in FIG. 9 the inner raceway 21 is an integral part of the shaft 2. Of course, this requires a different bearing configuration than that in FIG. 2.

Figure 10:
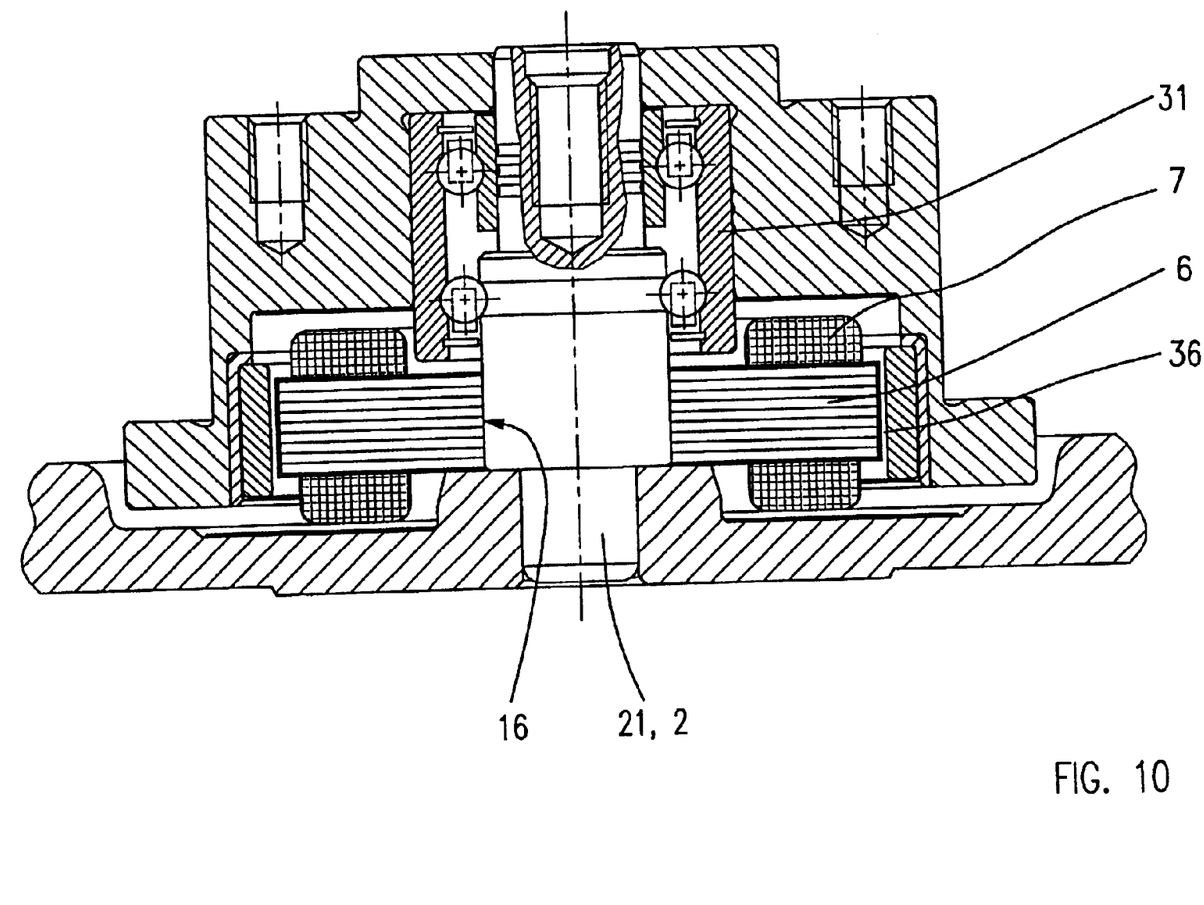
FIG. 10: profile of another embodiment of a spindle motor with direct centering of the sheet metal package on an inner raceway.
Figure 11:
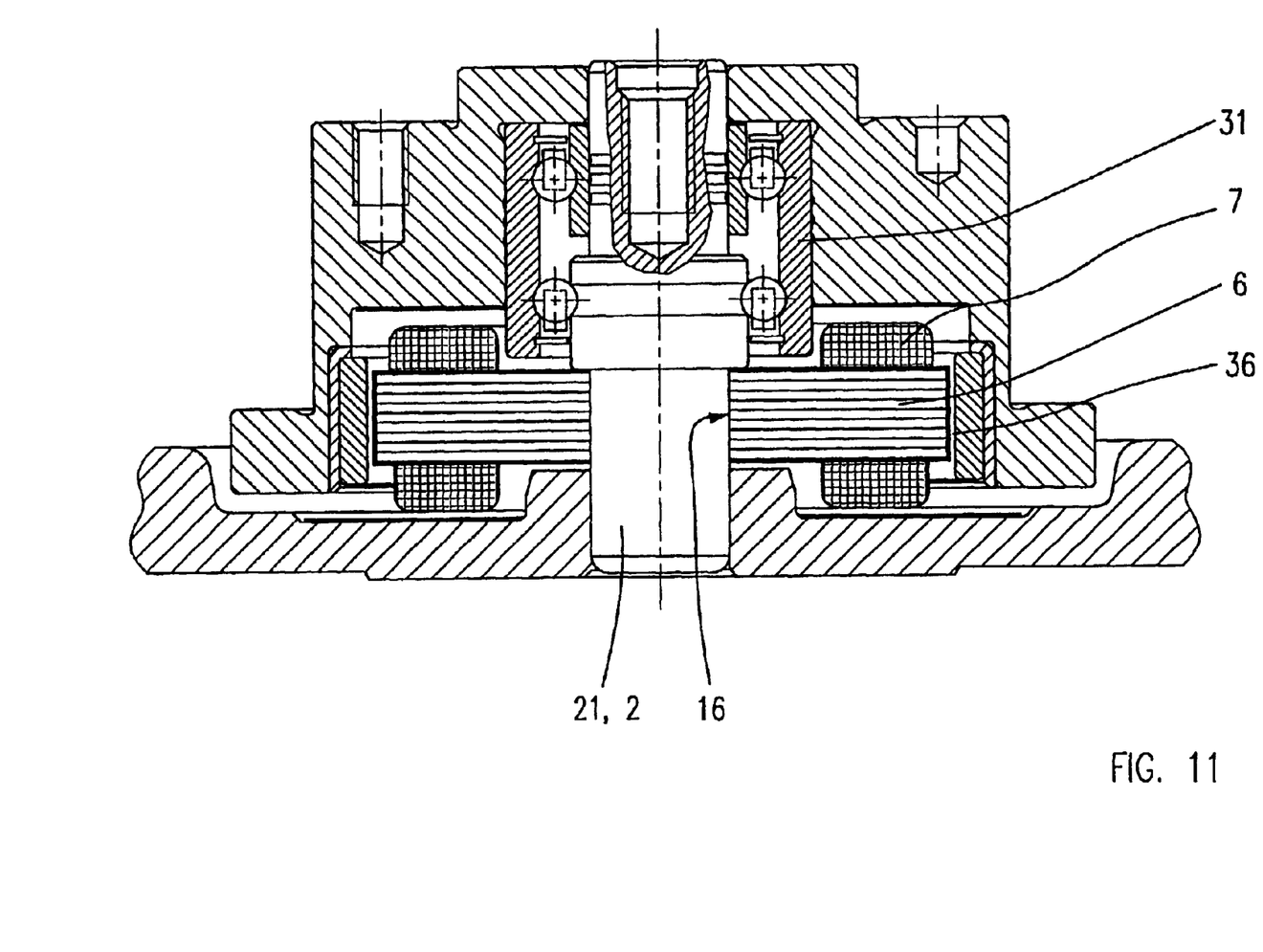
FIG. 11: an exemplary embodiment revised relative to FIG. 10.
Figure 12:
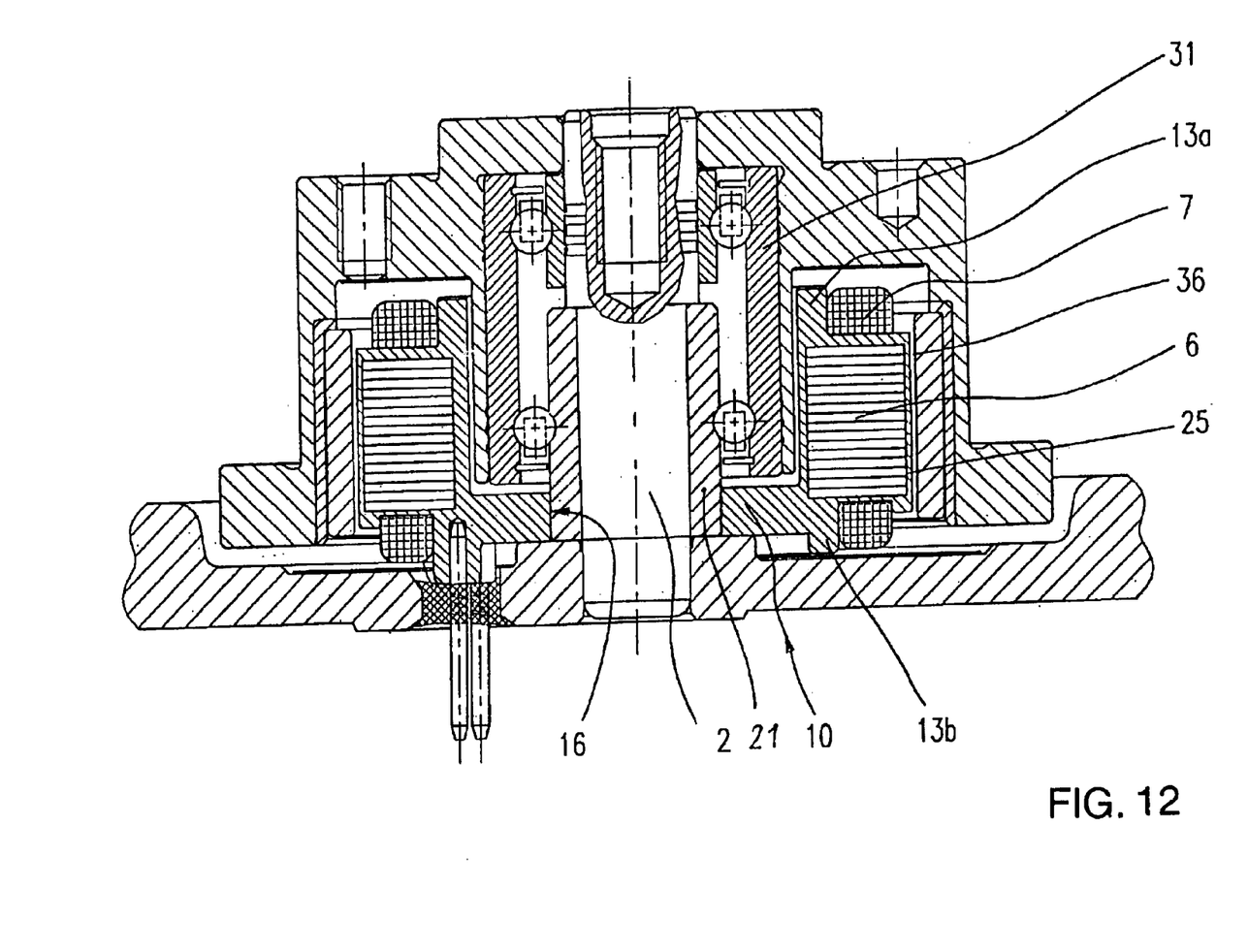
FIG. 12 is a further embodiment revised relative to FIG. 9.

Reversing one of the above described exemplary embodiments, FIGS. 10 and 11 show that when a centering casing is omitted and a stationary shaft is provided the sheet metal package can also be centered directly on the inner raceway of the ball bearing and/or on the shaft 2.

FIGS. 10 and 11 each show a stationary shaft 2. In both exemplary embodiments the outer ring 31 encompasses both bearing arrangements and the sheet iron package 6 is connected directly with the shaft 2 while a centering casing 10 is omitted.

In this case, it is material that the inner raceway of the bearing is worked directly into the shaft 2 itself so that in a manner of speaking the sheet iron package 6 sits directly on the bearing's "inner raceway" which is worked into the shaft.

While the sheet metal package in FIG. 10 lies on a bottom projection of the base plate 1 and it is positioned there in axial direction, the sheet iron package 6 in FIG. 11 lies on a radial collar of the shaft 2.

| References Nos. | |
| --- | --- |
| 1. | Base plate |
| 2. | Shaft |
| 3. | Rolling bearing (top) |
| 4. | Rolling bearing (bottom) |
| 5. | Rotor bell |
| 6. | Sheet iron package |
| 7. | Winding |
| 8. | Permanent magnet |
| 9. | Rear closing ring |
| 10. | Centering casing |

-continued

Figure 6:
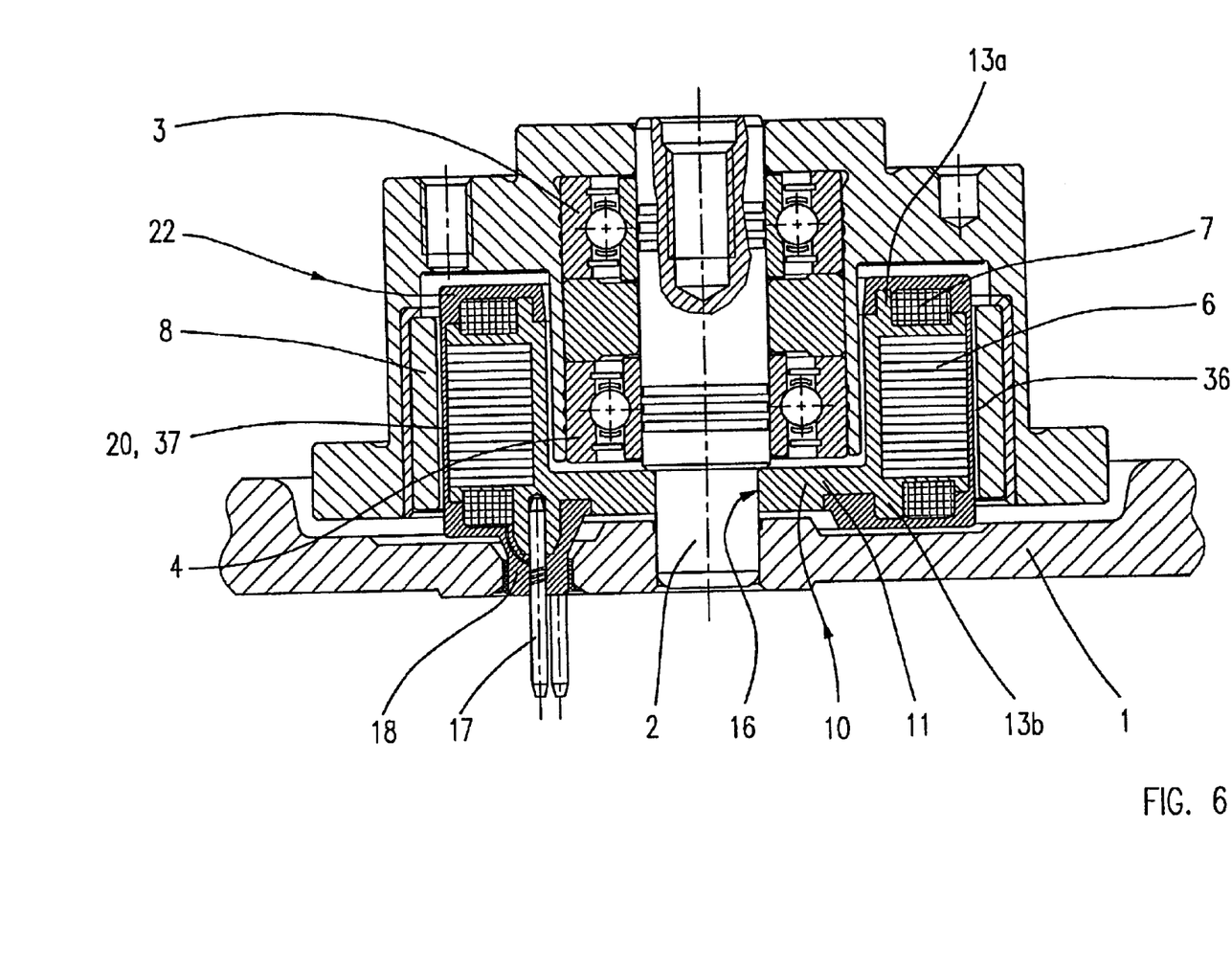
FIG. 6: a spindle motor with injection encompassed stator.

| References Nos. | |
| --- | --- |
| 11. | Bottom |
| 12. | Sleeve |
| 13. | Collar a, b |
| 14. | Bridge |
| 15. | Bridge |
| 16. | Centering surface |
| 17. | Connection pin |
| 18. | Projection |
| 19. | Centering casing |
| 20. | Lateral surface |
| 21. | Inner raceway (FIG. 9) |
| 22. | Stator, injection encompassed (FIG. 6) |
| 23. | Centering casing |
| 24. | Projection |
| 25. | Casing |
| 26. | Bridge |
| 27. | Bridge |
| 28. | Casing |
| 29. | Receptacle |
| 30. | Centering casing |
| 31. | Outer ring |
| 32. | Sleeve |
| 33. | Centering collar |
| 34. | Centering sleeve |
| 35. | Plotter (FIG. 7) |
| 36. | Air gap |
| 37. | Surface |
| 38. | Centering nose |
| 39. | Rotor bell |
| 40. | Top mould halve |
| 41. | Bottom mould halve |
| 42. | Supporting surface, top |
| 43. | Supporting surface, bottom |
| 44. | Injection mould |
| 45. | |

What is claimed is:

1. Spindle motor for hard disk drives with improved running accuracy, comprising: a rotor with at least one permanent magnet (8) firmly attached in the rotor bell (5), which rotor bell (5) is in connection so as to rotate via sets of rolling bodies (3, 4) with respect to a stationary shaft (2) on which a stator with sheet metal package (6) and windings (7) is located, wherein the shaft (2) is mounted on a base plate (1), characterized in that the sheet metal package (6) or the complete stator consisting of sheet metal package (6) and windings (7) is at least partially encompassed by means of injecting a centering casing (10, 19) of plastic, where the centering casing (10, 19) is centered directly on the stationary shaft (2), the base plate (1) and the centering casing (10, 19) being separate parts.

2. Spindle motor according to claim 1, characterized in that connection pins (17) for electric bonding are inserted or also injected in the centering casing (10, 19, 30).

3. Spindle motor according to claim 2, characterized in that the centering casing consists of plastic.

4. Spindle motor according to claim 2, characterized in that the stator is connected via a compression and/or adhesive connection with at least one of a plurality of stationary parts, the stationary parts including at least one of a shaft (2), a centering casing (19) and an outer ring (31).

5. Spindle motor according to claim 1, characterized in that the centering casing (10) consists of plastic.

6. Spindle motor according to claim 5, characterized in that the stator is connected via a compression and/or adhesive connection with at least one of a plurality of stationary parts, the stationary parts including at least one of a shaft (2), a centering casing (19) and an outer ring (31).

7. Spindle motor according to claim 1, characterized in that the stator is connected via a compression and/or adhesive connection with at least one of a plurality of stationary parts, the stationary parts including at least one of a shaft (2), a centering casing (19) and an outer ring (31).

8. Spindle motor for hard disk drives with improved running accuracy, comprising: a rotor with at least one permanent magnet (8) firmly attached in the rotor bell (5) and a shaft (2) attached in the rotor bell (5) which shaft is in connection so as to rotate with respect to a base plate (1) via sets of rolling bodies (3, 4), a stator fixed with respect to the base plate, the stator having a sheet metal package (6) and windings (7), characterized in that the sheet metal package (6) or the complete stator consisting of sheet metal package (6) and windings (7) is at least partially encompassed by means of injecting a centering casing (30, 34) of plastic, where the centering casing (30, 34) is centered directly on at least one of a outer ball bearing rings associated with the sets of rolling bodies (3, 4).or on a common outer ball bearing ring (31), the base plate (1) and centering casing (30, 34) being separate parts.

9. Spindle motor according to claim 8, characterized in that the connection pins for electric bonding are inserted or also injected in the centering casing.

10. Spindle motor according to claim 8, characterized in that the centering casing consists of plastic.

11. Spindle motor according to claim 8, characterized in that the stator is connected via a compression and/or adhesive connection with at least one of a plurality of stationary parts, the stationary parts including at least one of a centering casing (19) and an outer ring (31).

12. Spindle motor for hard disk drives with improved running accuracy, comprising a rotor with at least one permanent magnet (8) firmly attached in the rotor bell (5) and a shaft (2) attached in the rotor bell (5) which shaft is in connection so as to rotate with respect to a base plate (1) via sets of rolling bodies (3, 4), a stator fixed with respect to the base plate, the stator having a sheet metal package (6) and windings (7), characterized in that the stator, comprising sheet metal package (6) and windings (7), is connected with a centering casing (34) which is manufactured as a separate part, where the centering casing (34) is centered directly on at least one of outer ball bearing rings pertaining to the sets of rolling bodies (3, 4) or on a common outer ball bearing ring (31) and the base plate includes a sleeve connecting the base plate with the outer ball bearing rings pertaining to the set of rolling bodies (3, 4) or the common outer ball bearing ring (31).

13. Spindle motor according to claim 12, characterized in that the centering casing consists of plastic.

14. Spindle motor according to claim 12, characterized in that the stator is connected via a compression and/or adhesive connection with at least one of a plurality of stationary parts, the stationary parts including at least one of a centering casing (19) and an outer ring (31).

15. Spindle motor for hard disk drives with improved running accuracy, comprising a rotor with at least one permanent magnet (8) firmly attached in the rotor bell (5), which rotor bell (5) is in connection so as to rotate with respect to a shaft (2) via at least one set of rolling bodies (3, 4) which shaft is firmly connected with a base plate (1), a stator fixed with respect to the base plate, the stator having a sheet metal package (6) and windings (7), characterized in that the sheet metal package or the complete stator consisting of sheet metal package (6) and windings (7) is at least partially encompassed by means of injecting a centering casing (30) of plastic, where the centering casing (30) is centered directly on at least one inner ball bearing raceway pertaining to the said at least one sets of rolling bodies (3, 4).

16. Spindle motor according to claim 15, characterized in that the stator is connected via a compression and/or adhesive connection with at least one of a plurality of stationary parts, the stationary parts including at least one of a shaft (2), a centering casing (19) and an outer ring (31).

17. Spindle motor for hard disk drives with improved running accuracy, comprising: a rotor with at least one permanent magnet (8) firmly attached in the rotor bell (5), said rotor being in connection so as to rotate with respect to a shaft (2) via sets of rolling bodies (3, 4), a stator with a sheet metal package (6) and windings (7) located on said shaft, characterized in that the stator is centered directly, without including a centering casing, with its sheet metal package (6) at least partially engaging the shaft (2) and at least one of the inner ball bearing raceways integrally formed on the shaft (2).

18. Spindle motor according to claim 17, characterized in that the stator is connected via a compression and/or adhesive connection with at least one of a plurality of stationary parts, the stationary parts including at least one of a shaft (2), a centering casing (19) and an outer ring (31).

* * * * *

UNITED STATES PATENT AND TRADEMARK OFFICE
CERTIFICATE OF CORRECTION

PATENT NO. : 6,753,636 B2
DATED : June 22, 2004
INVENTOR(S) : Thilo Rehm and Jorg Hoffmann It is certified that error appears in the above-identified patent and that said Letters Patent is hereby corrected as shown below:

Title page,
Item [57], ABSTRACT,
Line 1, change "related" to -- relates --

Column 11,
Line 17, delete "." after "4"

Signed and Sealed this

Seventh Day of December, 2004

JON W. DUDAS
*Director of the United States Patent and Trademark Office*